Patented Feb. 10, 1925.

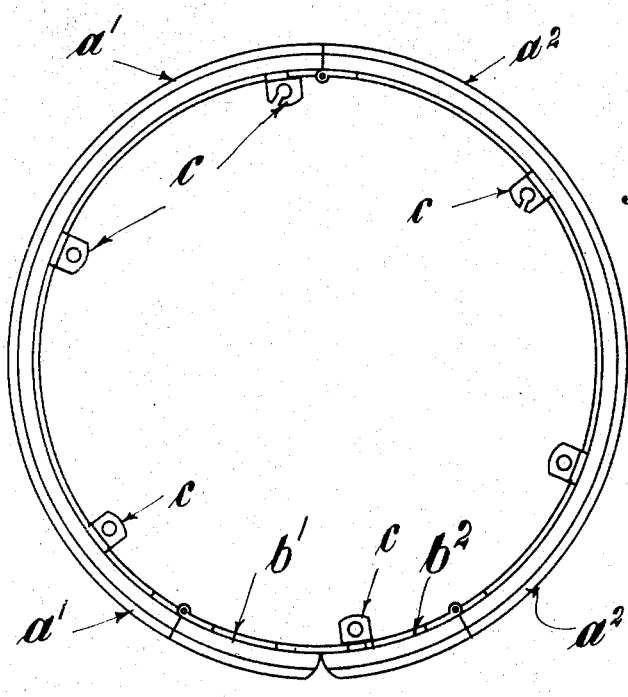
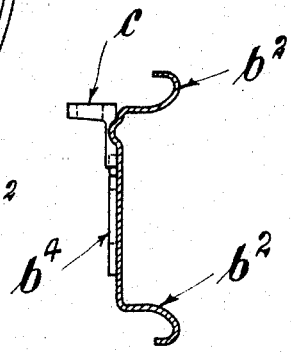
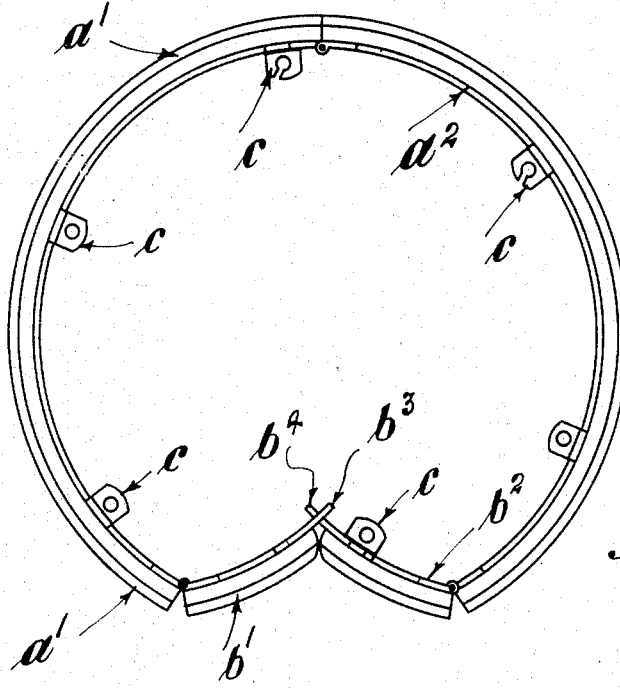

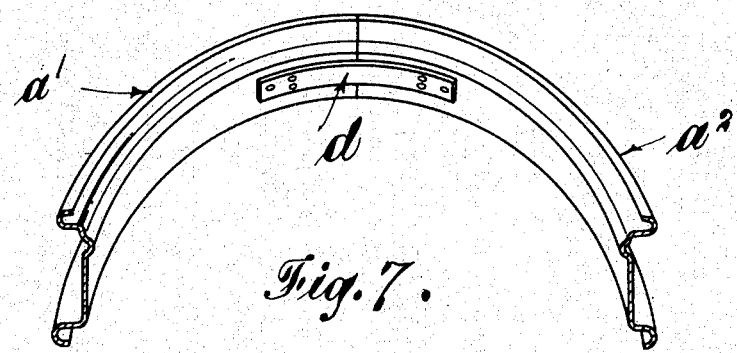
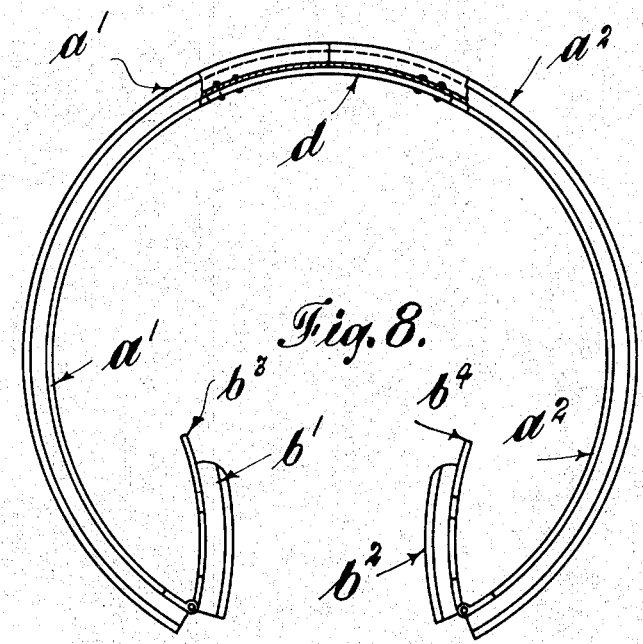

1,526,194

UNITED STATES PATENT OFFICE.

ARTHUR WOOD, OF DAVENPORT, AND ERNEST SAMUEL ABRAM, OF HEATON CHAPEL, ENGLAND.

COLLAPSIBLE RIM FOR THE TIRES OF VEHICLE WHEELS.

Application filed October 2, 1922. Serial No. 591,770.

*To all whom it may concern:*

Be it known that ARTHUR WOOD and ERNEST SAMUEL ABRAM, both subjects of the King of Great Britain and Ireland, residing at Davenport, Stockport, England, and Heaton Chapel, Stockport, England, respectively, have invented new and useful Improvements in or Relating to Collapsible Rims for the Tires of Vehicle Wheels, of which the following is a specification.

This invention has reference to the collapsible rims of vehicle wheels, and of the kind comprising hinged segments adapted to be turned or folded inwards on their hinges to collapse the rim to permit of the ready fitment and removal of the tire, and expanded or turned outwards into circumferential alignment to expand or complete the rim and secure the fitted tire thereon. In rims of the said kind as hitherto constructed, the arrangement of the segments has been such as to necessitate the use of a tool for expanding the segments. The object of this invention is to provide an improved arrangement of segments whereby the rim can be expanded by hand or foot, without the aid of a tool.

According to the invention, the improved rim comprises a plurality of large segments and two small segments, the large segments being hinged to each other and each of the small segments being hinged to the free end of one of the large segments and said small segments being of a combined length only slightly greater than a straight line drawn between the hinge centres when the rim is in the expanded (tire-holding) position. Said small segments are rounded at their free ends to a curve which is excentric to the hinge centres and is such that on the large segments being turned outwards and the small segments being also folded outwards until their free ends abut, a slight jerk of the foot or hand on the free ends will serve to jump the ends of the small segments over the "dead centre" line of the hinges, the said segments when fully expanded being locked in the expanded position by the tire.

Contrawise, to remove the tire from the expanded rim, a slight inward jerk on the free ends of the small segments will ensure of the rim being quickly collapsed.

The invention will be further described with the aid of the accompanying drawings, wherein:

Fig. 1 illustrates a side view of a collapsible rim constructed according to the invention, the rim being shown expanded.

Fig. 2 illustrates a side view of the same rim, but with the small segments in the position they occupy when about to expand (or further contract) the rim.

Fig. 3 illustrates a cross section of the rim drawn to a larger scale.

Figure 6:
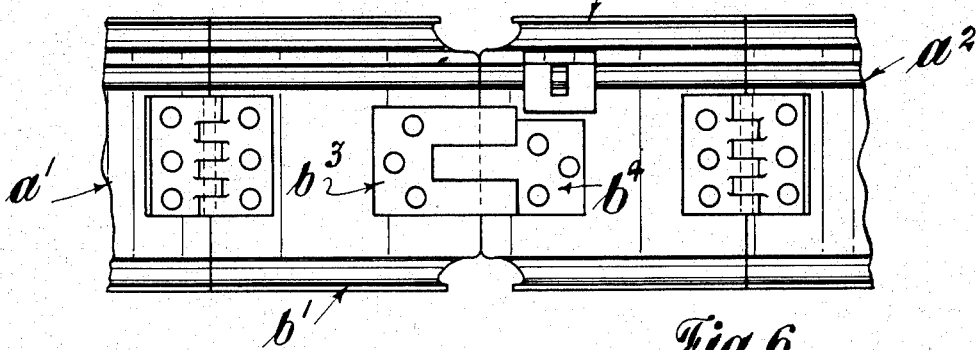

Fig. 6 a plan view of the small segments of the rim and portions of the large segments, also drawn to a larger scale.

Fig. 7 illustrates in perspective the upper half of the rim and shows a strip of spring steel, in lieu of a hinge, for connecting the larger segments to each other.

Fig. 8 illustrates, partly in section, a geometric side elevation of the rim, with the large segments in the normal position, and the small segments turned inwards.

Referring to the drawings, $a^1$, $a^2$ are the large segments, and $b^1$, $b^2$ the small segments, the several segments being hinged together, and the small segments being each free at one end.

The small segments are made to lengths which collectively only slightly exceed a straight line drawn between their hinge centres when the larger segments are in the expanded (tire-holding) position. At their free ends the small segments are rounded to a curve which is excentric to the hinge centres and is such that, on the ends abutting prior to expanding the rim, see Fig. 2, they allow of the segments being readily jerked over the "dead centre" line of the hinges and of moving outwards until they lie in circumferential alignment with the large segments, see Fig. 1, the expansion of the segments taking place against the resistance of the tire previously fitted to the rim.

Figure 4:
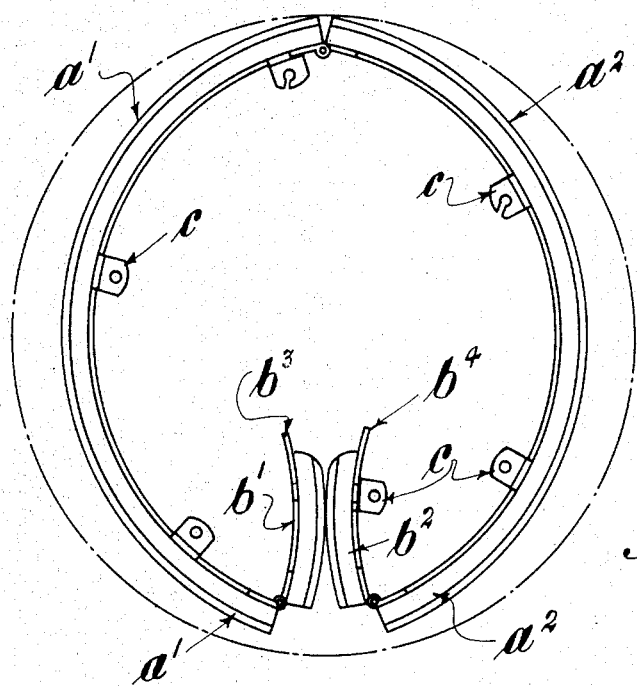
Fig. 4 illustrates the rim fully contracted.
Figure 5:
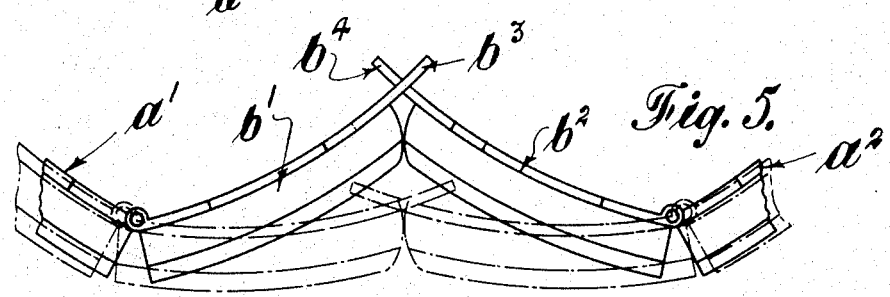
Fig. 5 illustrates a side view.

To collapse the rim for the purpose of removing the tire, a slight inward jerk on the free ends of the small segments (after the rim and tire have been removed from the wheel felloe) serves to move them back over the "dead centre" and allow all the segments to move inwards, see Fig. 4.

The curvature shape of the free ends of the small segments may be defined as being such that no part of the abutting faces during the movement from the inner to the outer positions causes any increase of the distance between the hinged ends beyond the maximum determined by the added lengths of the segments measured along the inner faces of said segments.

Due to the free ends of the small segments being formed to a uniform shape and to the segments being of uniform length, they are adapted, on being properly set one relatively to the other, to roll or move uniformly or evenly while expanding the rim. To ensure of this more positively, the free ends may be roughened or corrugated.

The rim when expanded is mounted on the felloe of the vehicle wheel in the usual way. In the example shown, the rim segments are provided with lugs $c, c$ for securing the rim to the wheel, one of the lugs being preferably near the free end of the segment $b^2$.

The free ends of the small segments are provided, one with a forked plate $b^3$ and one with a tongue $b^4$ to engage with the forked plate $b^3$ when the segments are being expanded and thereby guide their free ends and also prevent relative lateral movement of same. Any other and equivalent means may be employed for the purpose. The rim is of any suitable cross section, that shown being of the open channel shape, see Fig. 3.

By substituting a strip of spring metal or material $d$ for the hinge at the point where the large segments abut, see Figs. 7 and 8, the large segments are held normally expanded, while capable of being readily moved inwards at their free or opposite ends. With the large segments thus yieldingly expanded, they facilitate the manipulation of the small segments when arranging them in the position for expanding the rim.

What we claim is:—

In collapsible rims for vehicle wheels, a plurality of large segments and two small segments, the former being hingedly connected to each other and each of the small segments being hinged to one of the large segments, the combined length of the small segments being only slightly greater than a straight line drawn between the hinge centres when in the expanded (tire-holding) position, and each of said small segments being rounded at its free end to a curve which is excentric to the hinge centre and is such that the free ends of the segments will roll one against the other without increasing the distance between the hinged ends beyond the maximum determined by the added lengths of the segments measured along the inner faces of the said segments, and means on the inner faces of the small segments and projecting beyond their free ends for guiding the same as they expand or contract the rim, as set forth.

In testimony whereof they have signed their names to this specification.

ARTHUR WOOD.
ERNEST SAMUEL ABRAM.